(12) United States Patent
Murata et al.

(10) Patent No.: US 12,069,306 B2
(45) Date of Patent: Aug. 20, 2024

(54) IMAGE ENCODING APPARATUS AND METHOD FOR CONTROLLING THE SAME AND NON-TRANSITORY COMPUTER-READABLE STORAGE MEDIUM

(71) Applicant: CANON KABUSHIKI KAISHA, Tokyo (JP)

(72) Inventors: Takafumi Murata, Tokyo (JP); Shigeki Mochizuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 17/974,611

(22) Filed: Oct. 27, 2022

(65) Prior Publication Data

US 2023/0133895 A1 May 4, 2023

(30) Foreign Application Priority Data

Nov. 4, 2021 (JP) .................................. 2021-180509
Aug. 25, 2022 (JP) .................................. 2022-134421

(51) Int. Cl.
*H04N 19/63* (2014.01)
*G06T 3/4015* (2024.01)
(Continued)

(52) U.S. Cl.
CPC ........... *H04N 19/63* (2014.11); *G06T 3/4015* (2013.01); *H04N 19/12* (2014.11); *H04N 19/136* (2014.11); *H04N 19/18* (2014.11); *H04N 19/196* (2014.11)

(58) Field of Classification Search
CPC .................................................... H04N 19/63
(Continued)

(56) References Cited

U.S. PATENT DOCUMENTS 5,721,544 A 2/1998 Suzuki
10,063,807 B2 8/2018 Mochizuki
(Continued)

FOREIGN PATENT DOCUMENTS

JP 2019-004428 A 1/2019

OTHER PUBLICATIONS

Apr. 26, 2023 United Kingdom Official Action in United Kingdom Patent Appln. No. GB2215702.8.
(Continued)

*Primary Examiner* — Yulin Sun
(74) *Attorney, Agent, or Firm* — Venable LLP

(57) ABSTRACT

This invention provides an apparatus comprising an acquisition unit which acquires information representing optical compression ratios in a horizontal direction and in a vertical direction at a time of image capturing by an image capturing unit; a transform unit which wavelet transforms the image data to generate a plurality of sub-band data; a determination unit which determines quantization parameters for transform coefficients in a plurality of sub-bands obtained by the transform unit; and an encoding unit which quantizes the transform coefficients in the sub-band data obtained by the transform unit in accordance with the quantization parameters determined by the determination unit and to encode the quantized transform coefficients, wherein the determination unit performs weighting for each sub-band based on the information representing the compression ratios acquired by the acquisition unit to determine the quantization parameters.

20 Claims, 9 Drawing Sheets

(51) Int. Cl.
 *H04N 19/12* (2014.01)
 *H04N 19/136* (2014.01)
 *H04N 19/18* (2014.01)
 *H04N 19/196* (2014.01)

(58) Field of Classification Search
 USPC .................................................. 375/240.19
 See application file for complete search history.

(56) References Cited

U.S. PATENT DOCUMENTS

| | | |
|---|---|---|
| 10,776,956 B2 | 9/2020 | Mochizuki |
| 2017/0118477 A1* | 4/2017 | Suzuki ................. G06T 3/4015 |
| 2017/0353724 A1* | 12/2017 | Miyauchi ............. H04N 19/186 |
| 2018/0365863 A1 | 12/2018 | Mochizuki |
| 2019/0387228 A1* | 12/2019 | Togita ................. H04N 19/124 |

OTHER PUBLICATIONS

Jan. 5, 2024 United Kingdom Official Action in United Kingdom Patent Appln. No. GB2215702.8.

\* cited by examiner

1 BLOCK LINE = Lv1:4 LINE, Lv2:2 LINE, Lv3:1 LINE

FIG. 6A U COMPONENT
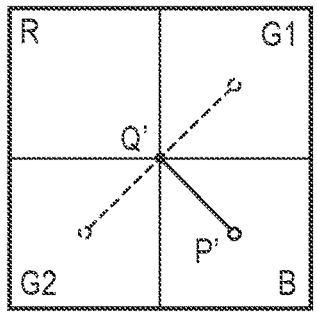
FIG. 6B V COMPONENT
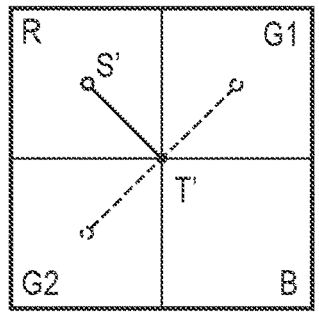
FIG. 6C GH COMPONENT
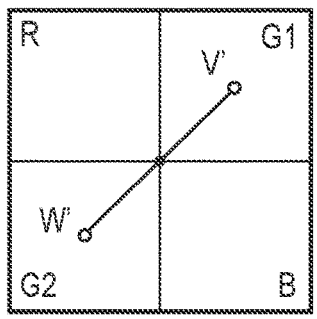
FIG. 6D Y COMPONENT
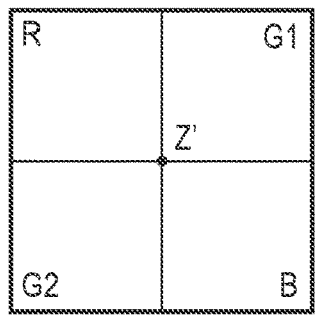
FIG. 7A U COMPONENT
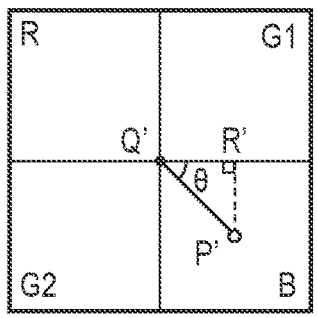
FIG. 7B V COMPONENT
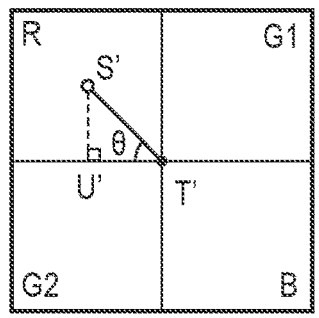
FIG. 7C GH COMPONENT
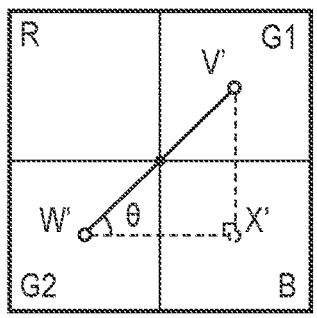

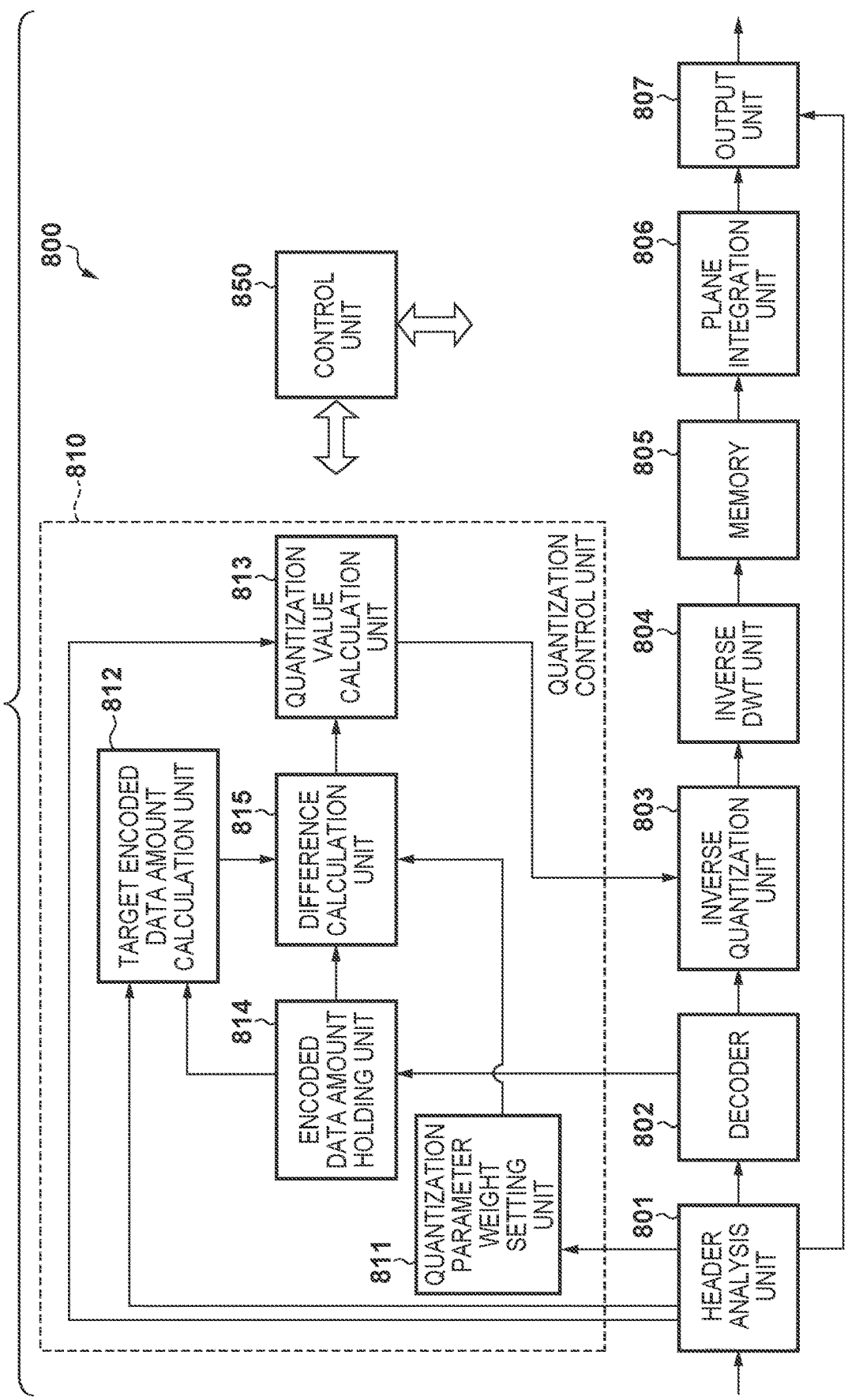

IMAGE ENCODING APPARATUS AND METHOD FOR CONTROLLING THE SAME AND NON-TRANSITORY COMPUTER-READABLE STORAGE MEDIUM

BACKGROUND OF THE INVENTION

Field of the Invention

The present invention relates to an image encoding apparatus and a method for controlling the same and a non-transitory computer-readable storage medium.

Description of the Related Art

Currently, digital image capturing apparatuses for recording moving images, such as digital video cameras, have become popular. In recent years, a scheme of recording RAW images has been applied not only for still images but also for moving images. This is thought to be because, despite RAW images needing an enormous amount of data for recording, correction and deterioration of the original image can be kept to a minimum, and the degree of freedom in image editing is high even after recording.

When recording a RAW moving image on a recording medium, it is desired that a moving image of sufficient length can be recorded. Therefore, it is desirable to compress and encode the RAW moving image before recording. Generally, a RAW image is an image of a Bayer pattern in which pixels—each an R, G, or B color—are arranged in a mosaic pattern. Adjacent pixels in the Bayer pattern have different color components, so the correlation between adjacent pixels is low. Therefore, it is difficult to obtain a high compression efficiency if they are encoded as they are. Therefore, pixels of like color components are extracted from the RAW image to generate a plurality of planes, each of a single component. Then, each plane is encoded, which increases the correlation between pixels in the plane, thereby improving the compression efficiency; this plane conversion technique is generally utilized as one of the techniques for compression encoding.

Also, as a conventional, typical compression encoding scheme, H.264 (H.264/MPEG-4 Part 10: Advanced Video Coding) is known. In this compression encoding scheme, for every block consisting of a predetermined number of pixels in one frame, the amount of data is compressed utilizing temporal redundancy and spatial redundancy, which moving images have. In H.264, compression encoding is achieved by combining techniques, such as motion detection and motion compensation for temporal redundancy, a discrete cosine transform (DCT) as a frequency transform for spatial redundancy, quantization, and entropy coding. However, if a compression ratio is increased to beyond a certain extent, block distortion, which is unique to the DCT transform, becomes noticeable, and subjectively, image deterioration becomes conspicuous.

Therefore, a sub-band coding technology that uses a discrete wavelet transform (DWT), in which low-pass filtering and high-pass filtering are applied, each in horizontal and vertical directions, thereby performing decomposition into frequency bands called sub-bands, has been adopted in a JPEG2000 scheme and the like. Sub-band coding produces less block distortion than encoding techniques that use the DCT and is characterized by better compression characteristics at high compression.

For example, a technique described in Patent Document 1, Japanese Patent Laid-Open No. 2019-4428, efficiently compresses RAW data by performing a plane conversion on a RAW image, generating a plurality of sub-bands by separating frequency components using a DWT transform, and then performing quantization and encoding for each sub-band. In Patent Document 1, in view of the characteristics of human vision, regarding the magnitude relationship of quantization parameters to be set for each sub-band, the farther on the low-frequency component side the sub-bands are, the smaller the quantization parameters, and the farther on the high-frequency component side the sub-bands are, the larger the quantization parameters. Therefore, since an HL (High-Low) sub-band and an LH (Low-High) sub-band of the same decomposition level are bands of the same frequency level, the magnitude relationship of the quantization parameters will be set the same, resulting in the same level of horizontal and vertical quantization distortion.

However, when a RAW image whose optical compression ratios are different in the horizontal and vertical directions is encoded using the technique of the above document and is then displayed, since it is stretched with respect to the directions of optical compression, the quantization distortion increases with respect to those directions. At this time, if the direction of optical compression is in one direction—either horizontal or vertical, the direction of the stretch associated therewith will be in one direction, which increases the quantization distortion in that direction, resulting in a problem that, at the time of display, that distortion will be visually recognized as image quality deterioration.

SUMMARY OF THE INVENTION

In view of the above problems, the present invention provides an image encoding apparatus for suppressing an increase in quantization distortion in either the horizontal or vertical direction associated with displaying an image whose optical compression ratios are different in the horizontal and vertical directions.

The present invention in its an aspect provides an image encoding apparatus operable to encode image data obtained by an image capturing unit, the apparatus comprising: an acquisition unit configured to acquire information representing optical compression ratios in a horizontal direction and in a vertical direction at a time of image capturing; a transform unit configured to wavelet transform the image data to generate a plurality of sub-band data; a determination unit configured to determine quantization parameters for transform coefficients in a plurality of sub-bands obtained by the transform unit; and an encoding unit configured to quantize the transform coefficients in the sub-band data obtained by the transform unit in accordance with the quantization parameters determined by the determination unit and to encode the quantized transform coefficients, wherein the determination unit is operable to perform weighting for each sub-band based on the information representing the compression ratios acquired by the acquisition unit to determine the quantization parameters.

According to the present invention, it is possible to generate encoded data suitable for images whose optical compression ratios in horizontal and vertical directions are different.

Further features of the present invention will become apparent from the following description of exemplary embodiments (with reference to the attached drawings).

BRIEF DESCRIPTION OF THE DRAWINGS

FIGS. 6A to 6D are diagrams illustrating directions of signal components of plane data according to a second embodiment.

FIGS. 7A to 7C are diagrams illustrating the decomposition of diagonal signal components in U, V, and GH plane data according to the second embodiment in horizontal and vertical directions.

FIG. 8 is a block configuration diagram of an image decoding apparatus according to the first embodiment.

DESCRIPTION OF THE EMBODIMENTS

Figure 1:
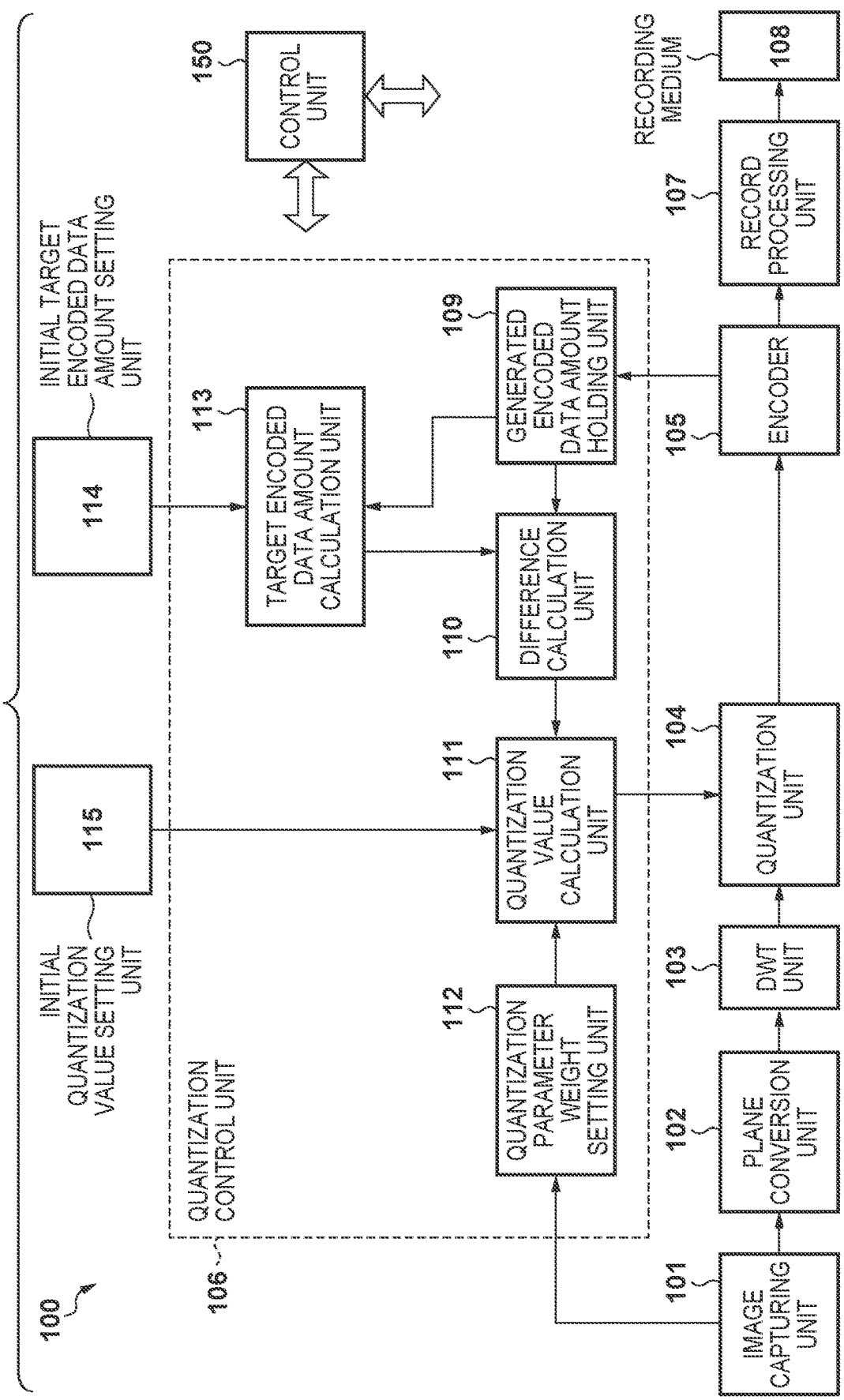
FIG. 1 is a block configuration diagram of an image encoding apparatus according to a first embodiment.

Hereinafter, embodiments will be described in detail with reference to the attached drawings. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block configuration diagram of a main portion of an image capturing apparatus 100 according to a first embodiment pertaining to encoding.

The image capturing apparatus 100 includes a control unit 150 for controlling respective processing units illustrated in FIG. 1. The control unit 150 is configured by a CPU, a ROM for holding programs to be executed by the CPU, and a RAM to be used as a work area.

The image capturing apparatus 100 can be implemented as, for example, a digital camera or a digital video camera. In addition, it may be implemented as any information processing terminal or image processing apparatus, such as a personal computer, a cellular phone, a smartphone, a PDA, a tablet terminal, or a portable media player, for example. FIG. 1 illustrates a configuration including an image capturing unit 101 in consideration of a case where it functions as a digital camera or the like, which is an image capturing apparatus. However, a supply source of images to be encoded is not limited to an image capturing unit and may be a storage medium that stores images to be encoded. It should be understood that embodiments being applied to an image capturing apparatus is merely for embodiment and ease of understanding.

[Image Capturing Unit]

The image capturing unit 101 includes an optical lens; a diaphragm; a lens optical system that is capable of optical zooming and includes a focus control and lens driving unit; and an image capturing element, such as a CCD image sensor or CMOS image sensor for converting optical information from the lens optical system into electric signals. The image capturing unit 101 outputs, to a plane conversion unit 102, RAW image data obtained by converting electrical signals obtained by the image capturing element to digital signals. Further, the image capturing unit 101 includes a non-volatile memory (not illustrated) for holding information on optical compression ratios in the horizontal and vertical directions as meta information and supplies that meta information to a quantization parameter weight setting unit 112. It is assumed that the image capturing unit 101 is capable of performing image capturing at a rate of 30 frames per second, for example. As for the optical lens, the lens unit can be attached to and detached from the image capturing apparatus and a configuration may be such that different types of lenses can be mounted. If the optical lens can be attached and detached, a configuration will be such that not only a typical lens unit whose optical compression ratios in the horizontal and vertical directions are 1 but also an anamorphic lens or the like whose optical compression ratios in the horizontal and vertical directions are different can be mounted.

[Plane Conversion Unit]

Figure 2:
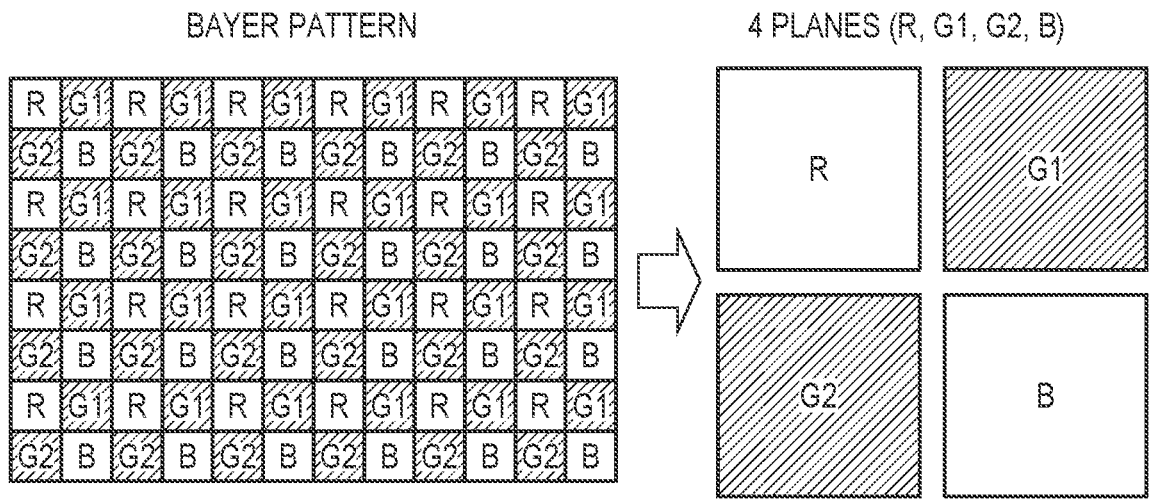
FIG. 2 is a diagram for explaining plane conversion in the first embodiment.

The plane conversion unit 102 takes input of RAW image data of a frame of interest of a Bayer pattern captured by the image capturing unit 101. The plane conversion unit 102 then separates one RAW image data into a plurality of planes, each of which is configured by a single component. FIG. 2 is a plane formation diagram for when RAW image data of a Bayer pattern, which is input image data, is separated into four planes. Adjacent 2×2 pixels in a Bayer pattern are configured by one red component (R), one blue component (B), and two green components (G1, G2). The plane conversion unit 102 separates the RAW image data into an R plane configured by only R components, a G1 plane configured by only G1 components, a G2 plane configured by only G2 components, and a B plane configured by only B components. When the number of horizontal pixels of RAW image data is expressed by W and the number of vertical pixels of RAW image data is expressed by H, the sizes of these four planes are, horizontally, W/2 pixels and, vertically, H/2 pixels. As a result of the above, when a plane of one color component is a target of interest, the correlation between adjacent pixels is high, which makes it easier to improve compression efficiency.

[Discrete Wavelet Transform (DWT) Unit]

A DWT unit 103 performs a frequency transform on the planes sequentially outputted from the plane conversion unit 102 and generates transform coefficients. The DWT transform is a transform that performs filtering on the entire image. Vertical and horizontal filtering can be performed when pixel data corresponding to the number of taps of the filter to be used has accumulated in a buffer memory. Therefore, by performing the DWT on a line-by-line basis of plane data and applying the DWT recursively to the generated low-frequency sub-band LL, it is possible to process the respective sub-bands in parallel.

Figure 3:
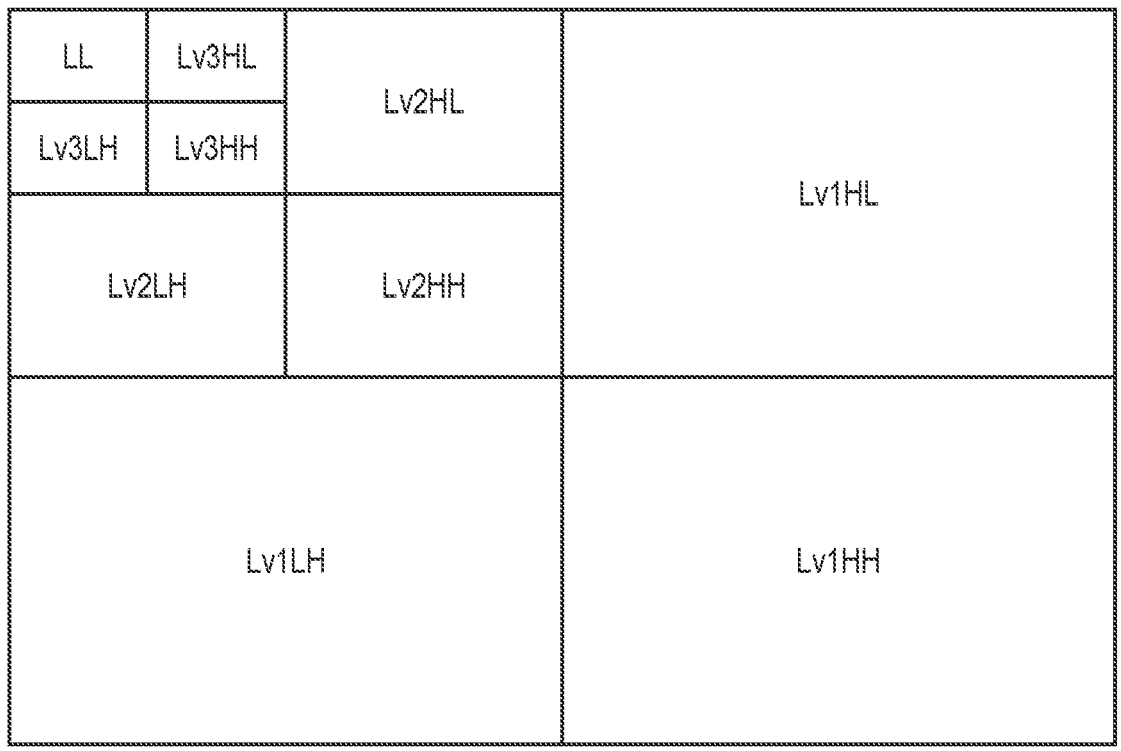
FIG. 3 is a sub-band formation diagram in a case where vertical filtering and horizontal filtering of a discrete wavelet transform (DWT) has each been performed three times.

FIG. 3 is a sub-band formation diagram obtained when a DWT, in which vertical and horizontal filtering processes are one set, is executed three times. In the figure, "L" and "H" indicate low frequency and high frequency, respectively, and regarding their order, a first part indicates a frequency band of a result of performing horizontal filtering and a second part indicates a frequency band of a result of performing vertical filtering. The numeral after "Lv" indicates the decomposition level of the DWT. When performing a DWT two or more times, a transform target is a sub-band LL, which is a low-frequency band, obtained by the immediately preceding transform. Therefore, every time a DWT is executed, the size will be half in the horizontal and vertical of the sub-bands of the immediately preceding transform. Further, for this reason, the sub-band LL remains after the final DWT; therefore, as illustrated, a notation representing the decomposition level is not given. The DWT unit 103 in the embodiment sequentially executes a DWT on the four planes generated from a frame of interest (a RAW image) to be encoded; however, there may be provided a plurality of DWT units 103 in order to shorten the processing time. For example, when two DWT units 103 are provided in parallel, the burden associated with the DWT becomes ½ of that of when there is one DWT unit 103, and the time that it takes to perform a transform can also be halved. Further, when four DWT units 103 are provided in parallel, the time that it takes to perform the DWT can be made ¼ of that of when there is one DWT unit 103.

In the present embodiment, a description will be given assuming that every time transform coefficients for one line are generated in each sub-band, the DWT unit 103 sequentially outputs the transform coefficients for one line of each sub-band to a quantization unit 104.

[Quantization Unit]

The quantization unit 104 quantizes transform coefficients inputted from the DWT unit 103 on a coefficient-by-coefficient basis, using a quantization parameter Qp generated by the quantization control unit 106. The quantization parameter Qp is a parameter whose value is such that the larger the value, the smaller the quantized value, which makes it possible to reduce the encoded data amount but makes image quality deterioration noticeable. Further, the quantization of the transform coefficients of the four planes may be performed plane by plane or for all planes in parallel. However, it is assumed that the quantization unit 104 in the embodiment quantizes the transform coefficients of the same sub-bands and the same positions in respective planes with a common quantization parameter Qp and supplies that quantization result to the encoder 105.

[Encoder]

The encoder 105 generates and outputs encoded data by entropy coding the transform coefficients of each plane after quantization by the quantization unit 104.

[Record Processing Unit]

A record processing unit 107 formats encoded data outputted from the encoder 105 into a predetermined recording format and records it in a recording medium 108 as a file including information necessary for decoding in its header. The record processing unit 107 stores meta information (compression ratios) obtained from the image capturing unit 101 in this header. It is for the image decoding apparatus to produce a normal image by horizontally or vertically interpolating an image, which has been obtained by decoding. The record processing unit 107 stores, in this header, information pertaining to initial values set by an initial target encoded data amount setting unit 114 and an initial quantization value setting unit 115. However, if the initial values set by the initial target encoded data amount setting unit 114 and the initial quantization value setting unit 115 are unified in advance between the encoding apparatus and the decoding apparatus, it is not necessary to include these pieces of information in the file header.

[Recording Medium]

The recording medium 108 is, for example, a recording medium configured by a non-volatile memory and is configured to be capable of being attached to and detached from the image capturing apparatus 100.

[Initial Settings]

The initial target encoded data amount setting unit 114 sets a target encoded data amount at the start of encoding of a frame of interest (RAW image of interest). The initial quantization value setting unit 115 sets the quantization parameter Qp at the start of encoding of a frame of interest. Generally, various setting values at the start of encoding are calculated by feedback control based on encoding information of the previous plane.

[Quantization Control Unit]

Next, the quantization control unit 106 will be described. The quantization control unit 106 controls the quantization parameter Qp so that the generated encoded data amount of a frame of interest converges to the target encoded data amount of the frame of interest. In the embodiment, a RAW image of the frame of interest is separated into four planes, each of which is subjected to a discrete wavelet transform, quantization, and encoding. The quantization parameter Qp used when quantizing four planes is common if the types of sub-bands are the same, and the positions at which the quantization parameter Qp is updated are also the same. This is because the common quantization parameter Qp is updated based on the encoded data amount of the frame of interest (4 planes).

Figure 4:
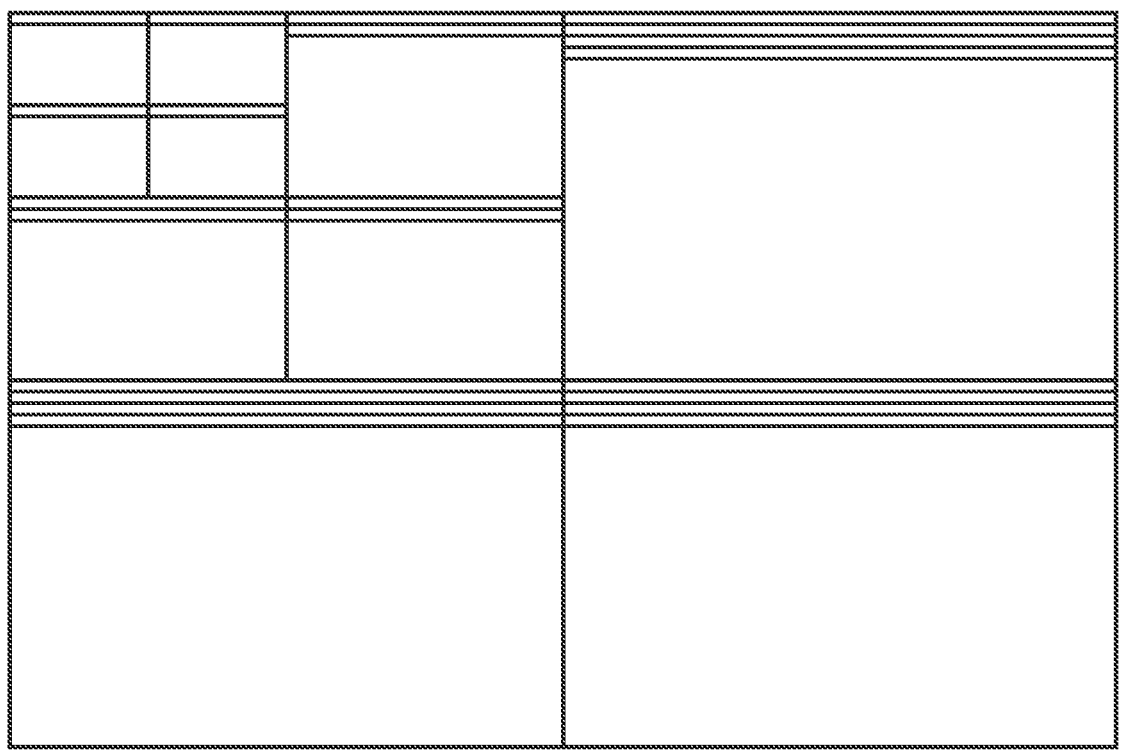
FIG. 4 is a diagram illustrating the relationship between sub-blocks and block lines in the first embodiment.

FIG. 4 is a diagram illustrating a unit of quantization control. A unit of control of the quantization parameter Qp will be described with reference to FIG. 4. As described above, an input image to be encoded is a RAW image of a Bayer pattern and is separated into four planes by the plane conversion unit 102. In addition, a DWT is applied to each plane. As described above, a unit of encoding is a line of a respective sub-band; however, a unit of quantization control is a collection of encoding results of the respective sub-bands at the same pixel positions. That is, as illustrated in FIG. 4, one line of sub-bands of a decomposition level 3 {Lv3HL, Lv3LH, Lv3HH} and a sub-band {LL}, two lines of sub-bands of a decomposition level 2 {Lv2HL, Lv2LH, Lv2HH}, and four lines of sub-bands of a decomposition level 1 {Lv1HL, Lv1LH, Lv1HH} are a unit of control of one Qp. That is, this unit of quantization control corresponds to data of one color component in one line of a RAW image obtained by capturing real space. Hereafter, a set of corresponding transform coefficients in the respective sub-bands, which are this unit of control, are referred to as a "block line".

A generated encoded data amount holding unit 109 takes as input and holds the amount of encoded data at the time of encoding of each block line notified from the encoder 105. A target encoded data amount calculation unit 113 calculates a target encoded data amount of one block line based on the target encoded data amount of a frame of interest and the total number of block lines.

A difference calculation unit 110 calculates a difference between a generated encoded data amount and a target encoded data amount for each block line and further calculates an integrated difference amount, which is an integrated value of the differences.

A quantization value calculation unit 111 calculates (updates) the quantization parameter Qp of an i-th block line of interest based on an integrated difference amount $D(i-1)$ notified from the difference calculation unit 110. Details will be described later.

[Quantization Value Calculation]

One of the quantization parameter calculation methods is a known technique described in MPEG2 Test Model 5.

According to Test Model 5, when an initial quantization parameter is Qini and a pixel block of interest is an i-th pixel block, a quantization parameter Qp[i] of the pixel block of interest is calculated using the following Equation (1) from ΣE(i−1), which represents an integration of differences between the encoded data amount in each pixel block from a head pixel block to an immediately-preceding i−1-th pixel block and a target encoded data amount per pixel block.

$$Qp[i] = Qini + r \times \Sigma E[i-1] \quad (1)$$

Here, r indicates a control sensitivity of the quantization parameter. The larger the control sensitivity r, the larger the Qp[i] fluctuates depending on ΣE[i−1], which improves the controllability of the encoded data amount but also increases the change in image quality. On the other hand, the smaller the control sensitivity r, the less Qp[i] depends on ΣE[i−1], which reduces the fluctuation thereof and can reduce the change in image quality; however, the controllability of the encoded data amount decreases.

In the embodiment, one frame of a RAW image of a Bayer pattern is separated into R, G1, G2, and B planes. Values 0, 1, 2, and 3 for identifying the respective plane are assigned to respective planes, and these values are represented as a variable pl. Also, an i-th block line of a respective plane pl is expressed as BL(pl, i). Then, the amount of encoded data generated when a block line BL(pl, i) is encoded is defined as C(BL(pl, i)), and a target encoded data amount of one block line is represented as TC.

At this time, the difference calculation unit 110 calculates the integrated value ΣE[i−1] of differences between the generated encoded data amount from the first block line to the an i−1-th block line immediately preceding the i-th block line of interest and the target encoded data amount according to the following Equation (2).

$$\Sigma E[i-1] = \Sigma\Sigma \{TC - C(BL(pl,k))\} \quad (2)$$

Here, ΣΣ expresses the sum of pl=0, 1, 2, 3, and k=0, 1, 2, . . . , i−1.

The quantization value calculation unit 111 calculates the quantization parameter Qp of the i-th block line of interest by applying an integrated value ΣE[i−1] obtained by the above Equation (2) to the previously described Equation (1). Then, the quantization value calculation unit 111 notifies the quantization unit 104 of the quantization parameter Qp after converting it into a quantization parameter Qp[pl][sb] of an actual respective sub-band. pl and sb indicate a corresponding plane and the type and decomposition level of a corresponding sub-band, respectively.

A method for calculating quantization parameters of each plane and sub-band by the quantization value calculation unit 111 will be described below. As illustrated in Equation (3), the quantization value calculation unit 111 calculates Qp[pl][sb] by multiplying a matrix mtx held for each plane and sub-band and optical compression ratios α in the horizontal and vertical directions to be set by the quantization parameter weight setting unit 112 by the quantization parameter Qp calculated by Equation (1). The optical compression ratios α in the horizontal and vertical directions to be set by the quantization parameter weight setting unit 112 are set using meta information recorded by the image capturing unit 101.

$$Qp[pl][sb] = Qp[i] \times mtx[pl][sb] \times \alpha \quad (3)$$

A configuration may be taken so as to provide Qp[pl][sb] in advance as a preset value, rather than calculating it using Equation (3) and switch the preset value in accordance with the optical compression ratios in the horizontal and vertical directions. Generally, mtx is set so as to perform control of the encoded data amount such that the higher the frequency region of the sub-band, the larger the Qp is set to be, and the lower the frequency region of the sub-band, the smaller the Qp is set to be, so that the higher the frequency component of image data, which is harder to visually perceive due to the characteristics of human vision, the more compressed the generated encoded data amount will be, thereby improving encoding efficiency. Therefore, the matrix mtx is set so that the higher the frequency of the sub-band, the larger the quantization parameter Qp, and the lower the frequency of the sub-band, the smaller the quantization parameter Qp. Further, the matrix mtx is set so that the quantization parameters are the same in the HL sub-band and the LH sub-band of the same decomposition level. In this embodiment, it is assumed that the matrix mtx is set such that 3LL:3HL:3LH:3HH:2HL:2LH:2HH:1HL:1LH:1HH=1:2:2:4:4:4:8:8:8:16.

Here, the optical compression ratios α in the horizontal and vertical directions will be described with reference to FIGS. 5A to 5C.

Figure 5A:
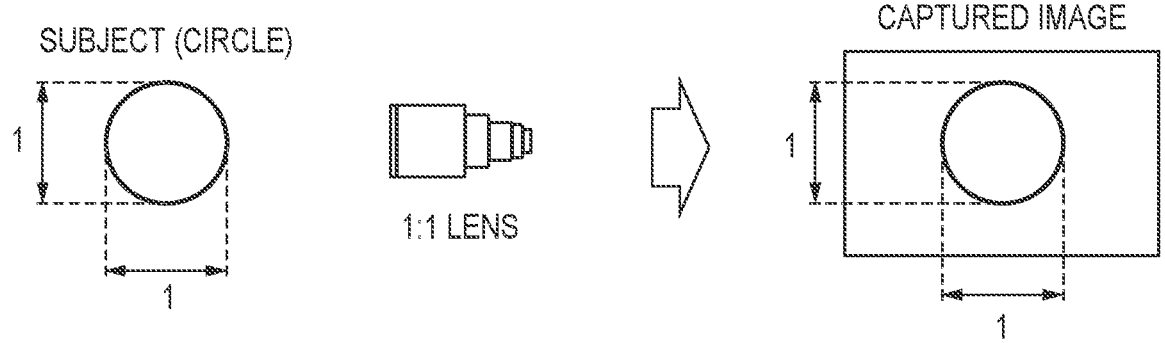
FIGS. 5A to 5C are diagrams illustrating lenses with horizontal and vertical optical compression ratio α according to the first embodiment and the relationship between the lenses and images that the lenses captured.

FIG. 5A illustrates a captured image of when a subject is captured using a 1:1 lens whose horizontal and vertical compression ratios are equal in the image capturing unit 101. When the subject is a circle, a horizontal length and a vertical length of the subject has a 1-to-1 relationship, and similarly, a horizontal length and a vertical length of the subject in the captured image also has a 1-to-1 relationship. Thus, in the example of FIG. 5A, the horizontal and vertical optical compression ratios α are 1.

Next, FIG. 5B will be described. FIG. 5B illustrates a captured image of when a subject is captured using a 2:1 lens in the image capturing unit 101.

Although the relationship between the horizontal length and the vertical length of the subject is 1 to 1 similarly to FIG. 5A, the relationship between the horizontal length and the vertical length in the captured image is ½ to 1 since the image is captured using a lens that optically compresses ½ times in the horizontal direction. Therefore, since the horizontal length when the vertical length is 1 (a reference) is ½, a horizontal optical compression ratio α becomes ½, and a vertical optical compression ratio α becomes 1.

Lastly, FIG. 5C will be described. FIG. 5C illustrates a captured image of when a subject is captured using a 1:2 lens in the image capturing unit 101. Although the relationship between the horizontal length and the vertical length of the subject is 1 to 1 similarly to FIGS. 5A and 5B, the relationship between the horizontal length and the vertical length in the captured image is 1 to ½ since the image is captured using a lens that optically compresses the image in the vertical direction. Therefore, since the vertical length when the horizontal length is 1 (a reference) is ½, a vertical optical compression ratio α becomes ½, and a horizontal optical compression ratio α becomes 1.

Here, in the embodiment, as a method of acquiring α, it is assumed that the quantization parameter weight setting unit 112 acquires α from meta information acquired by communicating with the lens unit mounted on the image capturing unit 101; however, α may be acquired according to user settings. For example, a configuration may be taken such that the user selects information on the horizontal and vertical compression ratios of the lens via the operation unit and the display unit (not illustrated), and the control unit 150 acquires the compression ratio of the lens selected by the user. Further, it may be acquired from information such as whether a lens whose optical compression ratios in the horizontal and vertical directions are equal or different is mounted.

Next, a specific example of a process of calculating a quantization parameter calculated by the quantization value calculation unit 111 in Equation (3) based on the optical compression ratios α in the horizontal and vertical directions set by the quantization parameter weight setting unit 112 for each sub-band will be described with reference to FIGS. 5A to 5C again.

First, a case where the horizontal and vertical optical compression ratios are equal, which is illustrated in FIG. 5A, will be described. When an image captured in FIG. 5A is encoded and the encoded image is displayed, the image is not stretched in either the horizontal or vertical direction, so an increase in the quantization distortion in one direction associated with display does not occur. Therefore, when calculating the quantization parameter Qp of each sub-band using Equation (3), the quantization value calculation unit 111 performs calculation where α=1 in all sub-bands including HL and LH sub-bands, that is, performs calculation with a setting for not changing the weight for each sub-band. Therefore, the relationship of the following Equation (4) is applied as the value of α for when calculating the quantization parameter Qp in the HL and LH sub-bands.

$$HL:LH=1:1 \quad (4)$$

Thus, a ratio of quantization parameters of respective sub-bands is 3LL:3HL:3LH:3HH:2HL:2LH:2HH:1HL:1LH:1HH=1:2:2:4:4:4:8:8:8:16.

Figure 5B:
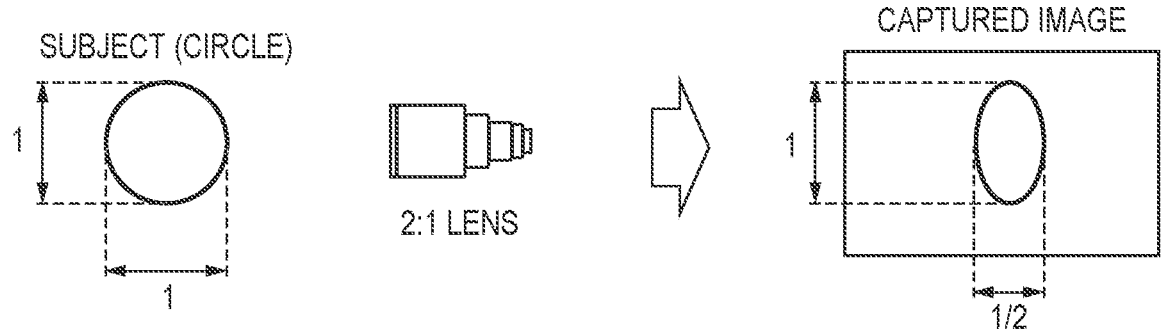

Next, a case where the 2:1 lens illustrated in FIG. 5B is used will be described. In FIG. 5B, the image is compressed to ½ in the horizontal direction with respect to the vertical direction. Therefore, if encoding is performed with the same quantization parameter weight setting for the sub-bands as in FIG. 5A, the quantization distortion will be the same in the horizontal and vertical directions at the time of encoding. However, due to only the horizontal direction being stretched by a factor of 2 at the time of display, the quantization distortion in the horizontal direction is increased, resulting in the distortion being visually recognized as deterioration in image quality. Therefore, it is desired to suppress the increase in the quantization distortion in the horizontal direction by making the quantization parameter Qp of the HL sub-band, which is related to image quality in the horizontal direction, smaller than those of the other sub-bands. Accordingly, at the time of calculating the quantization parameter Qp of each sub-band using Equation (3), when sb is the HL sub-band, the quantization value calculation unit 111 calculates a quantization parameter with the horizontal optical compression ratio α=½. When sb is the LH sub-band, the quantization value calculation unit 111 calculates the quantization parameter Qp with the vertical optical compression ratio α=1. Therefore, the relationship of the following Equation (5) is applied as the value of α for when calculating the quantization parameter Qp in the HL and LH sub-bands.

$$HL:LH=½:1 \quad (5)$$

As described above, in a case of a lens that compresses an image in the horizontal direction rather than in the vertical direction, assuming that the compression ratio in the horizontal direction with respect to the vertical direction is A (A<1), a ratio of the quantization parameters of the respective sub-bands is 3LL:3HL:3LH:3HH:2HL:2LH:2HH:1HL:1LH:1HH=1:2×A:2:4:4×A:4:8:8×A:8:16. In a case of the 2:1 lens of FIG. 5B, since the image is compressed to ½ in the horizontal direction with respect to the vertical direction, the compression ratio A in the horizontal direction with respect to the vertical direction=½. Thus, a ratio of quantization parameters of respective sub-bands is 3LL:3HL:3LH:3HH:2HL:2LH:2HH:1HL:1LH:1HH=1:2×½:2:4:4×½:4:8:8×½:8:16. Although the 2:1 lens has been described, in a case of a 1.33:1 lens (a lens that compresses an image to 1/1.33 in the horizontal direction with respect to the vertical direction), A=1/1.33, and the quantization parameter is determined using the weight coefficient of A. A configuration may be taken so as to, instead of acquiring the information of the compression ratio of the lens from the lens, the user selects the horizontal and vertical compression ratios of (an image captured by) the lens, and from the compression ratios selected by the user, determine A, which is the compression ratio in the horizontal direction with respect to the vertical direction.

Figure 5C:
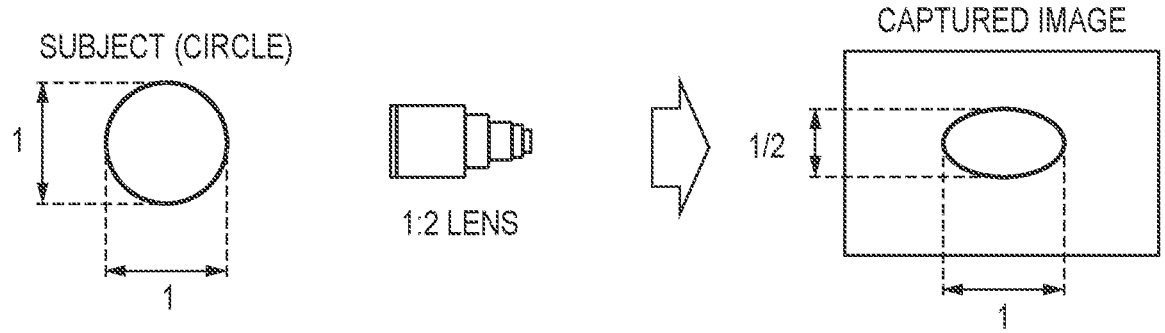

Lastly, a case where the 1:2 lens illustrated in FIG. 5C is used will be described. In a case of FIG. 5C, if encoding is performed with the same quantization parameter weight setting for the sub-bands as in FIG. 5A, the quantization distortion will be the same in the horizontal and vertical directions at the time of encoding. However, due to only the vertical direction being stretched by a factor of 2 at the time of display, the quantization distortion in the vertical direction is increased, resulting in the distortion being visually recognized as deterioration in image quality. Therefore, it is desired to suppress the increase in the quantization distortion in the vertical direction by making the quantization parameter Qp of the LH sub-band, which is related to image quality in the vertical direction, smaller than those of the other sub-bands. Accordingly, at the time of calculating the quantization parameter Qp of each sub-band using Equation (3), when sb indicates the LH sub-band, the quantization value calculation unit 111 calculates a quantization parameter Qp with the vertical optical compression ratio α=½. When sb is the HL sub-band, the quantization value calculation unit 111 calculates the quantization parameter Qp with the horizontal optical compression ratio α=1. Therefore, the relationship of the following Equation (6) is applied as the value of α for when calculating the quantization parameter Qp in the HL and LH sub-bands.

$$HL:LH=1:½ \quad (6)$$

In a case of a lens that compresses an image in the vertical direction rather than in the horizontal direction, assuming that the compression ratio in the vertical direction with respect to the horizontal direction is B (B<1), a ratio of the quantization parameters of the respective sub-bands is 3LL:3HL:3LH:3HH:2HL:2LH:2HH:1HL:1LH:1HH=1:2:2×B:4:4:4×B:8:8:8×B:16. In a case of the 1:2 lens of FIG. 5C, since the image is formed being compressed to ½ in the vertical direction with respect to the horizontal direction, a ratio B in the vertical direction with respect to the horizontal direction=½. Thus, a ratio of quantization parameters of respective sub-bands is 3LL:3HL:3LH:3HH:2HL:2LH:2HH:1HL:1LH:1HH=1:2:2×½:4:4:4×½:8:8:8×½:16. The 1:2 lens has been described; however, in a case of a 1:1.5 lens (a lens that forms an image compressing it to 1/1.5 in the vertical direction with respect to the horizontal direction) the quantization parameter is determined with the compression ratio B in the vertical direction with respect to the horizontal direction=1/1.5. A configuration may be taken so as to, instead of acquiring the information of the compression ratio from the lens, the user selects the horizontal and vertical compression ratios of (an image captured by) the lens, and from the compression ratios selected by the user, determine B, which is the compression ratio in the vertical direction with respect to the horizontal direction.

Thus, the sub-bands to be weighted in the quantization parameters of respective sub-band are switched depending on whether compression is horizontal (FIG. 5B) or vertical (FIG. 5C). Then, if compression is horizontal (FIG. 5B), the HL sub-band will be weighted with the compression ratio A in the horizontal direction with respect to the vertical direction so that the quantization parameter of the HL sub-band becomes smaller. Then, if compression is vertical (FIG. 5C), the LH sub-band will be weighted with a compression ratio B in the vertical direction with respect to the horizontal direction so that the quantization parameter of the LH sub-band becomes smaller.

As described above, by changing, in accordance with the optical compression ratios in the horizontal and vertical directions, the value of a to be set by the quantization parameter weight setting unit 112 for each sub-band, it becomes possible to suppress an increase in the quantization distortion in one direction which accompanies display. If sb is the HH sub-band, unlike the HL and LH sub-bands, the quantization parameter Qp is calculated without changing the weight of the quantization parameter ($\alpha$=1) in accordance with the optical compression ratios in the horizontal and vertical directions. Up until now, the method of setting the weight of the quantization parameter for each sub-band has been described using an example using 2:1 and 1:2 lenses; however, the horizontal and vertical optical compression ratios are not limited to these. Further, a numerical value close to the horizontal and vertical optical ratios may be applied to the optical compression ratio $\alpha$ instead of horizontal and vertical ratios.

[Image Decoding Apparatus]

Next, an image decoding apparatus according to the embodiment will be described.

FIG. 8 is a block configuration diagram of a main portion pertaining to decoding of an image decoding apparatus 800 for decoding encoded image data generated by the above-described image encoding apparatus (FIG. 1). Since encoding and decoding are closely related, a configuration pertaining to decoding of the image decoding apparatus and the processing details will be briefly described with reference to the figure.

The image decoding apparatus 800 includes a control unit 850 that controls the entire apparatus. The control unit 850 is configured by a CPU, a ROM for holding programs to be executed by the CPU, and a RAM to be used as a work area.

A header analysis unit 801 analyzes a file header of encoded image data to be decoded and acquires information necessary for decoding. This information includes information necessary for decoding such as information representing an initial quantization value (corresponding to the initial quantization value setting unit 115 in FIG. 1), an initial target encoded data amount (corresponding to the initial target encoded data amount setting unit 114 in FIG. 1), and horizontal and vertical optical compression ratios. If the initial quantization value and the initial target encoded data amount are unified in advance between the encoding apparatus and the decoding apparatus, it is not necessary to include this information in the file header.

It should be understood that a quantization parameter weight setting unit 811, a target encoded data amount calculation unit 812, a quantization value calculation unit 813, an encoded data amount holding unit 814, and a difference calculation unit 815 configuring a quantization control unit 810 include substantially the same functions as components of the same name in FIG. 1.

The header analysis unit 801 supplies the initial quantized value obtained by the analysis to the quantization value calculation unit 813 of the quantization control unit, the initial target encoded data amount to the target encoded data amount calculation unit 812, and information representing the horizontal and vertical optical compression ratios to the quantization parameter weight setting unit 811 and the output unit 807.

A decoder 802 obtains the quantization coefficients of block lines in the sub-bands of each plane by performing the process of decoding the encoded data following the header. The decoder 802 supplies the inverse quantization unit 803 with the quantization coefficients of all the planes obtained in the decoding process. In addition, since the decoder 802 finds the encoded data amount of each block line of each plane in the decoding process, the decoder 802 supplies the encoded data amount holding unit 814 with information indicating the encoded data amount each time the encoded data amount of the block line is found.

As a result, in the process in which the decoding of the block line progresses, the quantization value calculation unit 813 can determine the quantization parameters of the next block line in accordance with Equations (1) to (3) used by the encoding side described above.

The inverse quantization unit 803 performs inverse quantization in block line units for each plane in accordance with to the quantization parameters set by the quantization control unit 810 and obtains DWT transform coefficients. Naturally, the quantization parameters to be set in the inverse quantization unit 803 are the same as the quantization parameters used in the image encoding apparatus. The inverse quantization unit 803 supplies the inverse DWT unit 804 with the transform coefficients after inverse quantization.

The inverse DWT unit 804 performs an inverse DWT (inverse wavelet transform) according to the transform coefficients inputted from the inverse quantization unit 803 and outputs the result thereof to the memory 806. As a result, in response to the progress in the decoding process, four planes will be constructed in the memory 806.

The plane integration unit 806 performs the process of integrating the four planes, generates a RAW image of a Bayer pattern, and supplies output unit 807 with the RAW image.

The output unit 807, for example, performs the process of developing the inputted RAW image and generates a normal color image in which one pixel is configured by three components, RGB. Then, the output unit 807 performs on the generated color image a process of interpolating the generated color image in the horizontal and vertical directions in accordance with the information indicating the horizontal and vertical compression ratios supplied from the header analysis unit 801 and outputs it to the external display apparatus. However, when the horizontal and vertical compression ratio is 1:1, the output unit 807 does not perform the interpolation process. When the output destination of the output unit 807 is a printing apparatus, an image having color components, such as YMCK, is generated, and then the interpolation process is performed horizontally and vertically.

In the above decoding process, while the decoding process is being performed in block line units, the quantization value calculation unit 813 of the quantization control unit 810 updates the quantization parameters for performing inverse quantization for the block lines of each plane. Since a process of updating the quantization parameters is the same as the quantization value calculation unit 111 in the image capturing apparatus 100 of FIG. 1, a detailed description thereof will be omitted.

Variation of First Embodiment

An example in which the processes corresponding to the first embodiment described above is implemented by, for example, an application executed by an information processing apparatus typified by a personal computer will be described as a variation of the first embodiment.

Figure 9:
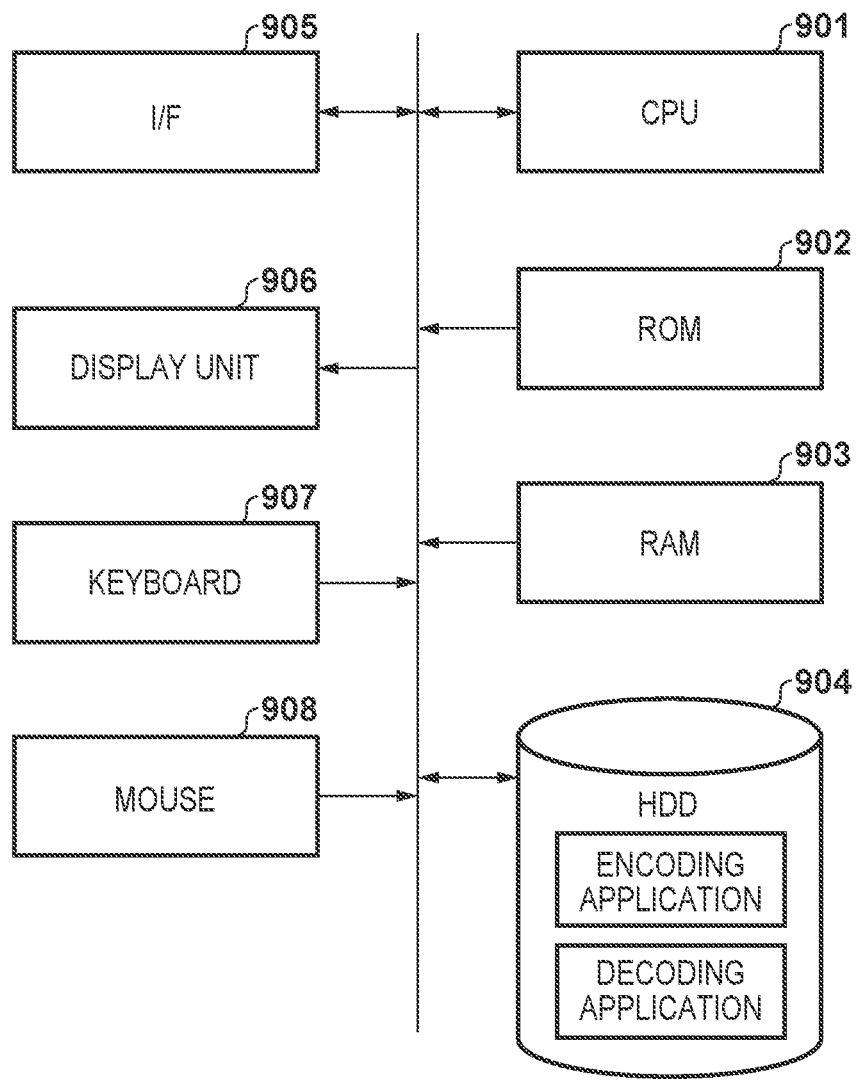
FIG. 9 is a program configuration diagram of the information processing apparatus according to a variation of the first embodiment.

FIG. 9 is a block configuration diagram of an information processing apparatus. When the power of the apparatus is turned on, a CPU 901 executes a boot program stored in a ROM 902, performs a process for initializing hardware, loads an Operating System (OS) stored in a hard disk (HDD) 904 into a RAM 903, and transfers (executes) control to (on) the OS, so that the apparatus functions as the information processing apparatus. That is, a display unit 906, a keyboard 907, and a mouse 908 function as an interface with the user. An I/F 905 is an interface for communicating with an external apparatus—typically a network interface, Universal Serial Bus (USB), or the like. RAW image data to be encoded in the present embodiment is also inputted from an external unit through this I/F 905. In the above configuration, when the user inputs a predetermined instruction by operating the keyboard 907 or the mouse 908, the CPU 901 loads an encoding application or decoding application from the HDD 904 into the RAM 903 and executes it, so that the apparatus functions as an image encoding apparatus or image decoding apparatus.

Figure 10:
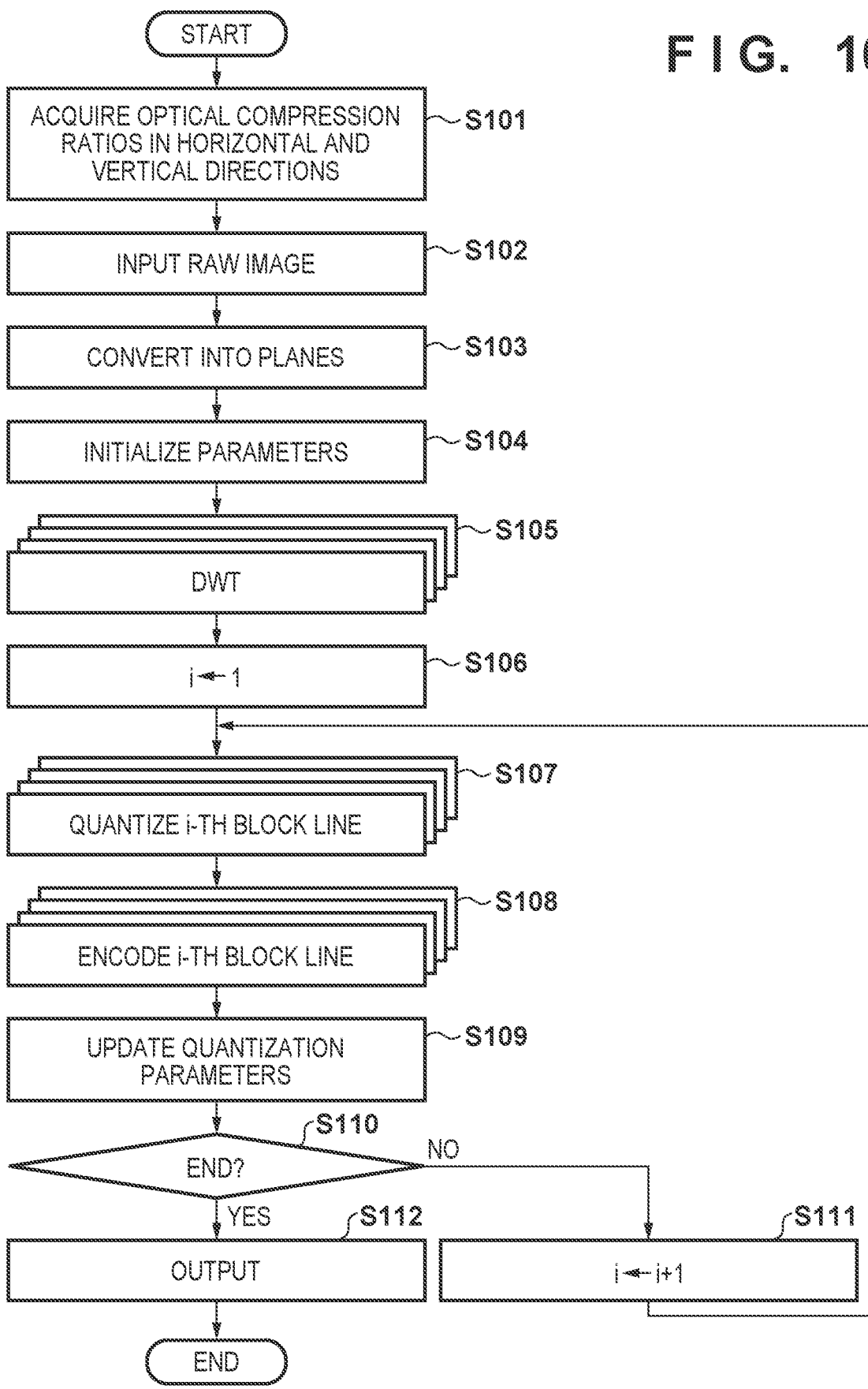
FIG. 10 is a flowchart for explaining a procedure of processing for image encoding.

Hereinafter, processes in a case where the apparatus functions as an image encoding apparatus will be described with reference to a flowchart of FIG. 10. Basically, when the CPU 901 functions as an image encoding apparatus by executing a program, the CPU 901 performs processes corresponding to the respective processing units in FIG. 1; for details, refer to the first embodiment.

In addition, in the following description, it is assumed that RAW image data of a Bayer pattern to be encoded is already stored in the HDD 904 as a file. In addition, it is assumed that information indicating the horizontal and vertical optical compression ratios at the time of image capturing is stored in the header of the file.

In step S101, the CPU 901 acquires information indicating the horizontal and vertical optical compression ratios from the RAW image file to be encoded. This information may be inputted by the user from the operation unit.

Then, in step S102, the CPU 901 inputs the RAW image data from that file and expands it in the RAM 903.

In step S103, the CPU 901 generates four planes, R, G1, G2, and B, from the RAW image data expanded in the RAM 903 and stores them in the RAM 903.

In step S104, the CPU 901 initializes various parameters prior to encoding. This initialization process includes the setting of initial quantization value, initial target encoded data amount, and the like. This initialization process also includes a process of clearing an area for storing a cumulative sum of the encoded data amount of a block line and the target encoded data amount of the block line to zero.

In step S105, the CPU 901 performs a DWT on each of the four planes. The CPU 901 stores the sub-bands obtained by this process in the RAM 903. There are four boxes illustrated in step S105 in the flowchart of FIG. 10 to indicate that DWTs are performed for the four planes.

In step S106, the CPU 901 sets a variable i, which defines an order of the block line, to an initial value "1". Then, in step S107, the CPU 901 reads and quantizes the DWT coefficients of the i-th block line to be encoded in each plane from the sub-bands obtained by the DWT and stored in the RAM 903.

In step S108, the CPU 901 encodes the quantization coefficients of the i-th block line of each plane and temporarily stores the generated encoded data in the RAM 903. At this time, the CPU 901 obtains a difference between the amount of encoded data and the target encoded data amount of the i-th block line of each plane and cumulatively adds the differences (a process corresponding to Equation (2)).

In step S109, the CPU 901 updates the quantization parameters for the block line to be encoded next (a process corresponding to Equation (3)).

Then, in step S110, the CPU 901 determines whether or not all the block lines have been encoded based on the value of the variable i. Then, if there is an unencoded block line, the CPU 901 advances the process to step S111 and increments the variable i by one. The CPU 901 then returns the process to step S107 in order to encode the next block line.

On the other hand, when all the block lines have been encoded, the CPU 901 advances the process from step S110 to step S112. In step S112, the CPU 901 creates in the HDD 904 a file header including various information necessary for decoding (including information indicating horizontal and vertical compression ratios). The CPU 901 formats into a preset format structure the encoded data stored in the RAM 903 following the file header and output it, thereby creating an encoded image data file.

Figure 11:
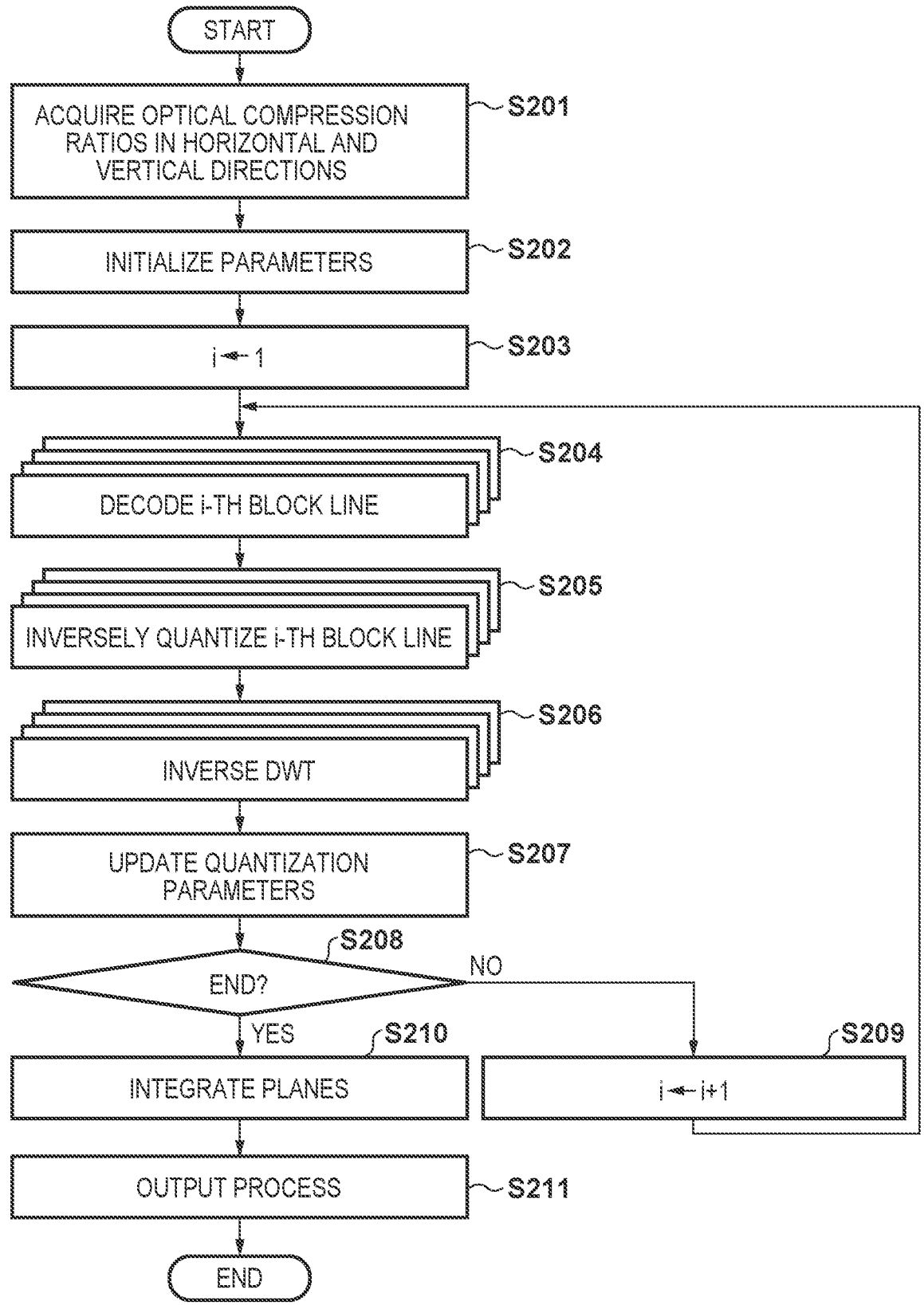
FIG. 11 is a flowchart for explaining a procedure of processing for image decoding.

Next, a process in a case where the apparatus functions as an image decoding apparatus will be described with reference to a flowchart of FIG. 11. Basically, when the CPU 901 functions as an image decoding apparatus by executing a program, the CPU 901 performs processes corresponding to the respective processing units in FIG. 8; for details, refer to the first embodiment.

Further, in the following description, an encoded image file has already been stored in the HDD 904, and a description from when a decoding process is performed until an image is displayed on the display unit 906 will be given.

In step S201, the CPU 901 acquires information indicating optical compression ratios in the horizontal and vertical directions by analyzing a file header of an encoded image file to be decoded. This information may be inputted by the user from the operation unit.

In step S202, the CPU 901 initializes various parameters prior to decoding. This initialization process includes setting of an initial quantization value, an initial target encoded data amount, and the like. This initialization process also includes a process of clearing an area in the RAM 903 for storing a cumulative sum of an encoded data amount of a block line and a target encoded data amount of a block line to zero. Next, in step S203, the CPU 901 sets the variable i, which defines an order of the block line, to an initial value "1".

In step S204, the CPU 901 decodes the i-th block line of each plane and obtains quantized transform coefficients. At this time, since the encoded data amount of the i-th block line is found, the CPU 901 obtains a difference between that encoded data amount and a target encoded data amount of the block line and performs an update by adding the difference to the value of the area described above (a process corresponding to Equation (2)).

In step S205, the CPU 901 performs inverse quantization for the quantization coefficients of the i-th block line of each plane. When the variable i is "1", the quantization is performed according to the quantization parameter obtained by the initialization process. Further, when the variable i is other than "1", the immediately preceding block line is inversely quantized using the quantization parameter after an update by the decoding process.

In step S206, the CPU 901 performs an inverse DWT on the transform coefficients obtained by inverse quantization and obtain an image of a block line. The CPU 901 stores the obtained image data of a block line in the RAM 903. When performing an inverse DWT, since transform coefficients of the number of taps of the filters to be used must be obtained; unless that is met, an inverse DWT is not performed.

In step S207, in preparation for decoding the next block line, the CPU 901 updates the quantization parameters (a process corresponding to Equation (3)) based on the accumulated sum of differences between the encoded data amount of the block line and the target encoded data amount of the block line. That is, the quantization parameters that accords with each sub-band are determined according to the horizontal and vertical optical compression ratios.

In step S208, the CPU 901 determines whether or not all block lines have been decoded. If there is an undecoded block line, the CPU 901 advances the process to step S209 and increments the variable i only by "1". The CPU 901 then returns the process to step S204 in order to decode the next block line.

On the other hand, when all the block lines have been decoded, the CPU 901 advances the process from step S208 to step S211. In step S210, the CPU 901 performs a process of integrating the four planes reproduced on the RAM 903 and generates a RAW image of a Bayer pattern. The CPU 901 then advances the process to step S211.

In step S211, the CPU 901 performs a process of developing on the generated RAW image and generates a color image in which one pixel is configured by R, G, and B components. Then, the CPU 901 generates an image whose horizontal and vertical scale is 1:1 by performing a process of enlarging the generated color image in the horizontal or vertical direction in accordance with the horizontal and vertical compression ratios acquired in step S201 and outputs the image to the display unit 906.

As described above, the same processes as the first embodiment described above, can also be realized by a computer program.

Second Embodiment

Next, a second embodiment will now be described. A configuration of an apparatus in the second embodiment is the same as FIG. 1 of the first embodiment.

However, the plane conversion unit 102 according to the second embodiment converts RAW image data into one luminance plane (Y plane) and three non-luminance planes. In the first embodiment, only the optical compression ratios in the horizontal and vertical directions are used to determine the quantization parameter weights for each sub-band in each plane, while in the second embodiment, an example in which the optical compression ratio as well as features of signal component directions of each plane are taken into consideration when determining the quantization parameters will be described.

The plane conversion unit 102 according to the second embodiment converts RAW image data into three non-luminance planes (U, V, GH planes) in accordance with the following Equations (7) to (9) and a luminance plane (Y plane) as shown in Equation (10).

$$U = B - (G1 + G2)/2 \quad (7)$$

$$V = R - (G1 + G2)/2 \quad (8)$$

$$GH = G1 - G2 \quad (9)$$

$$Y = (R + B + G1 + G2)/4 \quad (10)$$

In the second embodiment, each plane is converted as described above as an example of plane conversion; however, the conversion method is not limited to this.

FIGS. 6A to 6D illustrate representations of the directions of signal components in the respective planes. FIGS. 6A to 6D are diagrams focusing on adjacent 2×2 pixels (R, G1, G2, B) in the Bayer pattern illustrated in FIG. 2.

First, according to Equation (7), the U plane becomes a difference between an arithmetic mean value of the G1 component and the G2 component and a B component. Therefore, a direction represented by a signal component U is a diagonal direction connecting a point P', which is a position of the center of gravity of the B component, and a point Q', which is a position of the center of gravity of a signal obtained by averaging the G1 component and the G2 component, by a solid line as illustrated in FIG. 6A.

According to Equation (8), the V plane becomes a difference between an arithmetic mean of the G1 component and the G2 component and an R component. A direction represented by a signal component V is a diagonal direction connecting a point S', which is a position of the center of gravity of the R component, and a point T', which is a position of the center of gravity of a signal obtained by averaging the G1 component and the G2 component, by a solid line as illustrated in FIG. 6B.

According to Equation (9), the GH plane is a difference between the G1 component and the G2 component. Therefore, a direction represented by a signal component GH is a diagonal direction connecting, as illustrated in FIG. 6C, a position V' of the center of gravity of the G1 component and a position W' of the center of gravity of the G2 component by a solid line.

Lastly, accordingly to Equation (10), the Y plane is an arithmetic mean of the R, G1, G2, and B components. Therefore, a position of the center of gravity of a signal component Y is a point Z', which is a position of the center of the respective components as illustrated in FIG. 6D, and, as there is no direction of the signal component Y, is represented as a point.

As a method for setting a weight to be set by the quantization parameter weight setting unit 112 in the second embodiment, calculation may be performed in accordance with the optical compression ratios α in the horizontal and vertical directions as described in the first embodiment. However, in view of the fact that some signal components after plane conversion is in a diagonal direction, setting the weights after decomposing those into horizontal and vertical directions makes it possible to perform encoding in which the degree of influence of quantization distortion in the horizontal and vertical directions that accompanies the stretch at the time of display is further taken into account.

The diagonal signal components in the U, V, and GH planes are decomposed into horizontal and vertical directions as illustrated in FIGS. 7A to 7C. In FIG. 7A, an intersection of the horizontal axis when a line is drawn vertically in the horizontal axis direction from the point P' with respect to FIG. 6A is a point R'. A line segment connecting the two points p1 and p2 is denoted as "L (p1, p2)". Further, an angle ∠P'Q'R' is set to be θ, and a length L(P'Q') is set to be 1, which is a reference. In this case, the ratio of lengths of line segments L(Q'R'), L(R'P'), and L(P'Q') are as in the following Equation (11).

$$L(Q'R'):L(R'P'):L(P'Q')=\cos\theta:\sin\theta:1 \quad (11)$$

Next, FIG. 7B corresponds to FIG. 6B. An intersection of the horizontal axis when a line is drawn vertically in the horizontal axis direction from the point S' is a point U'. When an angle ∠S'T'U' is set to be θ, and a length of a line segment L(S'T') is set to be 1, which is a reference, a ratio of lengths of line segments L(T'U'), L(U'S'), and L(S'T') is as in the following Equation (12).

$$L(T'U'):L(U'S'):L(S'T')=\cos\theta:\sin\theta:1 \quad (12)$$

Lastly, FIG. 7C corresponds to FIG. 6C. An intersection for when a line is drawn perpendicularly in the horizontal axis direction from point the V' and a line is drawn perpendicularly in the vertical axis direction from the point W' is a point X'. When an angle ∠V'W'X' is set to be θ, and a length of a line segment L(V'W') is set to be 1, which is a reference, a ratio of lengths of line segments L(W'X'), L(X'V'), and L(V'W') is as in the following Equation (13).

$$L(W'X'):L(X'V'):L(V'W')=\cos\theta:\sin\theta:1 \quad (13)$$

Here, a method of setting a to be set by the quantization parameter weight setting unit 112 for each plane and sub-band will be described with reference to FIGS. 5A to 5C. First, in FIG. 5A, since the relationship between the horizontal and vertical lengths of the image to be encoded is a 1-to-1 relationship, cos θ and sin θ are 1/√2 and 1/√2, respectively, and Equations (11) to (13) are expressed by the relationship in the following Equation (14).

$$L(Q'R'):L(R'P'):L(P'Q')=L(T'U'):L(U'S'):L(S'T')=L(W'X'):L(X'V'):L(V'W')=1/\sqrt{2}:1/\sqrt{2}:1 \quad (14)$$

Since a ratio of lengths of line segments of Equation (14) is synonymous with α to be set in each sub-band, the following Equation (15) is applied as the value of α of the HL, LH, and HH sub-bands in the U, V, and GH planes.

$$HL:LH:HH=1/\sqrt{2}:1/\sqrt{2}:1 \quad (15)$$

Since the Y plane does not have a particular direction for the signal components, the relationship of the following Equation (16) is applied as the value of α of HL, LH, and HH sub-bands.

$$HL:LH:HH=1:1:1 \quad (16)$$

Next, a description will be given for the case of FIG. 5B; in this case, since the relationship between the horizontal and vertical lengths is a ½ to 1 relationship, cos θ and sin θ are 1/√5 and 2/√5, respectively. Therefore, Equation (12) will become the relationship of the following Equation (17).

$$L(Q'R'):L(R'P'):L(P'Q')=L(T'U'):L(U'S'):L(S'T')=L(W'X'):L(X'V'):L(V'W')=1/\sqrt{5}:2/\sqrt{5}:1 \quad (17)$$

Therefore, the relationship of the following Equation (18) is applied as the value of α of the HL, LH, and HH sub-bands in the U, V, and GH planes.

$$HL:LH:HH=1/\sqrt{5}:2/\sqrt{5}:1 \quad (18)$$

The relationship of the following Equation (19) is applied as the value of a of the HL, LH, and HH sub-bands in the Y plane.

$$HL:LH:HH=½:1:1 \quad (19)$$

Lastly, a case of FIG. 5C will be described. In this case, since the relationship between the horizontal length and the vertical length is a 1-to-½ relationship, cos θ and sin θ are 2/√5 and 1/√5, respectively. Therefore, Equation (13) will become the relationship of the following Equation (20).

$$L(Q'R'):L(R'P'):L(P'Q')=L(T'U'):L(U'S'):L(S'T')=L(W'X'):L(X'V'):L(V'W')=2/\sqrt{5}:1/\sqrt{5}:1 \quad (20)$$

Therefore, the relationship of the following Equation (21) is applied as the value of α of the HL, LH, and HH sub-bands in the U, V, and GH planes.

$$HL:LH:HH=2/\sqrt{5}:1/\sqrt{5}:1 \quad (21)$$

The relationship of the following Equation (22) is applied as the value of a of the HL, LH, and HH sub-bands in the Y plane.

$$HL:LH:HH=1:½:1 \quad (22)$$

As described above, according to the second embodiment, by setting the weight of each plane and sub-band in consideration of not only the horizontal and vertical optical compression ratios but also the directions of the signal components of each plane, it becomes possible to perform encoding that further takes into account the degree of influence of quantization distortion in the horizontal or vertical direction that accompanies the stretch at the time of display.

In the first embodiment, regarding the values of the quantization parameters, if the sub-bands are of the same type and the block lines are of the same position, the quantization parameters are assumed to be the same between the planes. This is because the only difference between the four planes in the first embodiment is the color component, and the planes have the same weights. In contrast, the second embodiment encodes the luminance Y plane and the three color difference planes and, for the luminance plane, sets the quantization parameters to be sufficiently smaller than those of the other color difference planes.

Further, the processes corresponding to the above second embodiment may be realized by a computer executing a program as in the variation of the first embodiment.

Further, in the above embodiments, examples in which the compression ratio in the horizontal and vertical directions is 2:1 or 1:2 have been described; however, the ratio may be of another ratio. In such cases, it is sufficient to set the quantization parameters to be set for HL and LH sub-bands of the same decomposition level in accordance with the ratio.

In the above first embodiment, variation example, and second embodiment, the encoding target is a RAW image of a Bayer pattern; however, the image may be of another format. For example, when encoding a monochrome image, since the image is an image originally configured by only a single luminance component, the plane conversion unit 102 is unnecessary. In addition, the present invention may be applied to color images represented by luminance and chrominance components, such as YCbCr. In such cases, it is sufficient that the same processes as described above are performed on the Y plane, Cb plane, and Cr plane.

In the above embodiments, a Bayer pattern in which R, G1, G2, and B pixels are arranged in 2×2 pixels in order of a raster scan has been given as the example; however, in cases of other Bayer patterns, the quantization parameters may be determined in accordance with the arrangement thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-180509, filed Nov. 4, 2021, and 2022-134421, filed Aug. 25, 2022 which are hereby incorporated by reference herein in their entirety.

What is claimed is:

1. An image encoding apparatus operable to encode image data obtained by an image capturing unit, the apparatus comprising:
   an acquisition unit configured to acquire information representing optical compression ratios in a horizontal direction and in a vertical direction at a time of image capturing;
   a transform unit configured to wavelet transform the image data to generate a plurality of sub-band data;
   a determination unit configured to determine quantization parameters for transform coefficients in a plurality of sub-bands obtained by the transform unit; and
   an encoding unit configured to quantize the transform coefficients in the sub-band data obtained by the transform unit in accordance with the quantization parameters determined by the determination unit and to encode the quantized transform coefficients,
   wherein the determination unit is operable to perform weighting for each sub-band based on the information representing the compression ratios acquired by the acquisition unit to determine the quantization parameters.

2. The apparatus according to claim 1, wherein the determination unit is operable to perform weighting using weighting coefficients, which correspond to the information representing compression ratios acquired by the acquisition unit, to determine the quantization parameters.

3. The apparatus according to claim 2, wherein the determination unit is operable to determine a sub-band to be weighted among the plurality of sub-bands based on the information representing the compression ratios acquired by the acquisition unit.

4. The apparatus according to claim 1, wherein the determination unit is operable to switch between weighting an LH sub-band or an HL sub-band in accordance with the compression ratios acquired by the acquisition unit.

5. The apparatus according to claim 1, wherein in a case where, regarding the optical compression ratios in the horizontal direction and the vertical direction, a compression ratio in the horizontal direction with respect to the vertical direction is a first ratio, wherein the first ratio is less than 1,
   the determination unit is operable to determine the quantization parameters such that a ratio of a quantization parameter to be applied to an HL sub-band with respect to a quantization parameter to be applied to an LH sub-band in the same decomposition level is the first ratio.

6. The apparatus according to claim 1, wherein the determination unit
   in a case where the optical compression ratios in the horizontal direction and the vertical direction are 1, is operable to determine the quantization parameters to be the same quantization parameters for an HL sub-band and an LH sub-band in the same decomposition level, and
   in a case where, regarding the optical compression ratios in the horizontal direction and the vertical direction, the compression ratio in the horizontal direction with respect to the vertical direction is a first ratio, wherein the first ratio is less than 1, is operable to set a quantization parameter to be applied to the HL sub-band smaller than a quantization parameter to be applied to the LH sub-band in the same decomposition level by weighting the HL sub-band using the first ratio to determine the quantization parameters.

7. The apparatus according to claim 1, wherein in a case where, regarding the optical compression ratios in the horizontal direction and the vertical direction, a compression ratio in the vertical direction with respect to the horizontal direction is a second ratio, wherein the second ratio is less than 1,
   the determination unit is operable to determine the quantization parameters such that a ratio of a quantization parameter to be applied to an LH sub-band with respect to a quantization parameter to be applied to an HL sub-band in the same decomposition level is the second ratio.

8. The apparatus according to claim 1, where the determination unit,
   in a case where the optical compression ratios in the horizontal direction and the vertical direction are 1, is operable to determine the quantization parameters to be the same quantization parameters for an HL sub-band and an LH sub-band in the same decomposition level, and
   in a case where, regarding the optical compression ratios in the horizontal direction and the vertical direction, the compression ratio in the vertical direction with respect to the horizontal direction is a second ratio, wherein the second ratio is less than 1, is operable to set a quantization parameter to be applied to the LH sub-band smaller than a quantization parameter to be applied to the HL sub-band in the same decomposition level by weighting the LH sub-band using the second ratio to determine the quantization parameters.

9. The apparatus according to claim 1, wherein an optical lens unit can be attached to or detached from the image encoding apparatus, the acquisition unit is operable to acquire the information representing the optical compression ratios in the horizontal direction and the vertical direction by communicating with the lens unit, and the determination unit is operable to determine the quantization parameters based on the information representing the optical compression ratios in the horizontal direction and the vertical direction acquired from the lens unit.

10. The apparatus according to claim 1, wherein the acquisition unit is operable to acquire information representing compression ratios selected by a user via an operation unit of the image encoding apparatus, and the determination unit is operable to determine the quantization parameters based on the information representing the compression ratios selected by the user acquired by the acquisition unit.

11. The apparatus according to claim 10, wherein in a case where the information representing the compression ratios selected by the user indicates compression ratios in which more compression has been performed in the horizontal direction than in the vertical direction, the determination unit is operable to determine a quantization parameter to be applied to an HL sub-band to be smaller than a quantization parameter to be applied to an LH sub-band of the same decomposition level.

12. The apparatus according to claim 1, further comprising a plane conversion unit configured to convert an image obtained by the image capturing unit into a plurality of planes, each configured by a single component, wherein the transform unit is operable to wavelet transform each plane obtained by the plane conversion unit.

13. The apparatus according to claim 12, wherein the image capturing unit is operable to output a RAW image of a Bayer pattern, and the plane conversion unit is operable to convert the RAW image into an R plane, a G1 plane, a G2 plane, and a B plane.

14. The apparatus according to claim 13, wherein in a case where the optical compression ratios in the horizontal direction and the vertical direction indicate compression ratios in which an image in the horizontal direction with respect to the vertical direction is ½ times in the image obtained by the image capturing unit, the determination unit is operable to determine a quantization parameter to be applied to an HL sub-band to be ½ of a quantization parameter to be applied to an LH sub-band in the same decomposition level.

15. The apparatus according to claim 13, wherein in a case where the optical compression ratios in the horizontal direction and the vertical direction indicate compression ratios in which an image in the vertical direction with respect to the horizontal direction is ½ times in the image obtained by the image capturing unit, the determination unit is operable to determine a quantization parameter to be applied to an LH sub-band to be ½ of a quantization parameter to be applied to an HL sub-band in the same decomposition level.

16. The apparatus according to claim 12, wherein the image capturing unit is operable to output a RAW image of a Bayer pattern in which R, G1, G2, and B pixels are arranged in 2×2 pixels in order of a raster scan, the plane conversion unit is operable to converts the RAW image into U, V, and GH planes of color differences in the following and a Y plane of luminance, $U = B - (G1+G2)/2$ $V = R - (G1+G2)/2$ $GH = G1 - G2$ $Y = (R+B+G1+G2)/4.$ 17. The apparatus according to claim 16, wherein in a case where the optical compression ratios in the horizontal direction and the vertical direction indicates compression ratios in which an image in the horizontal direction with respect to the vertical direction is ½ times in the image obtained by the image capturing unit, the determination unit is operable to set a ratio of values of quantization parameters to be set for HL, LH, and HH sub-bands of the same decomposition level of the Y plane to be ½:1:1, and is operable to set a ratio of values of quantization parameters to be set for HL, LH, and HH sub-bands of the same decomposition level of the U, V, and GH planes to be $1/\sqrt{5}:2/\sqrt{5}:1$.

18. The apparatus according to claim 16, wherein in a case where the optical compression ratios in the horizontal direction and the vertical direction indicates compression ratios in which an image in the vertical direction with respect to the horizontal direction is ½ times in the image obtained by the image capturing unit, the determination unit is operable to set a ratio of values of quantization parameters to be set for HL, LH, and HH sub-bands of the same decomposition level of the Y plane to be 1:½:1, and is operable to set a ratio of values of quantization parameters to be set for HL, LH, and HH sub-bands of the same decomposition level of the U, V, and GH planes to be $2/\sqrt{5}:1/\sqrt{5}:1$.

19. A method of controlling an image encoding apparatus operable to encode image data obtained by an image capturing unit, the method comprising:

(a) acquiring information representing optical compression ratios in a horizontal direction and in a vertical direction at a time of image capturing;

(b) wavelet transforming the image data to generate a plurality of sub-band data; and (c) determining quantization parameters for transform coefficients in a plurality of sub-bands obtained in the step (b); and (d) quantizing the transform coefficients in the sub-band data obtained in the step (b) in accordance with the quantization parameters determined in the step (c) and encoding the quantized transform coefficients, wherein, in the step (c), by weighting for each sub-band based on the information representing the compression ratios acquired in the step (a), the quantization parameters are determined.

20. A non-transitory computer-readable storage medium storing a program which, when read and executed by a computer, caused the computer to execute the steps of a method of controlling an image encoding apparatus operable to encode image data obtained by an image capturing unit, the method comprising:

(a) acquiring information representing optical compression ratios in a horizontal direction and in a vertical direction at a time of image capturing;

(b) wavelet transforming the image data to generate a plurality of sub-band data; and (c) determining quantization parameters for transform coefficients in a plurality of sub-bands obtained in the step (b); and
(d) quantizing the transform coefficients in the sub-band data obtained in the step (b) in accordance with the quantization parameters determined in the step (c) and encoding the quantized transform coefficients,
wherein, in the step (c), by weighting for each sub-band based on the information representing the compression ratios acquired in the step (a), the quantization parameters are determined.

* * * * *